US008496171B2

(12) United States Patent
Ross et al.

(10) Patent No.: US 8,496,171 B2

(45) Date of Patent: Jul. 30, 2013

(54) FRAUD PREVENTION

(75) Inventors: Gary Ross, Dundee (GB); Graeme Mitchell, Dundee (GB); Alistair Lowden, Dundee (GB); Yoshitaka Utsumi, Kanagawa (JP)

(73) Assignee: NCR Corporation, Duluth, GA (US)

( * ) Notice: Subject to any disclaimer, the term of this patent is extended or adjusted under 35 U.S.C. 154(b) by 89 days.

(21) Appl. No.: 13/099,812

(22) Filed: May 3, 2011

(65) Prior Publication Data

US 2012/0280041 A1 Nov. 8, 2012

(51) Int. Cl.
*G06K 7/00* (2006.01)

(52) U.S. Cl.
USPC .......................................................... 235/439

(58) Field of Classification Search
USPC .......................................................... 235/439
See application file for complete search history.

(56) References Cited

U.S. PATENT DOCUMENTS

| | | | | |
|---|---|---|---|---|
| 2009/0207976 | A1* | 8/2009 | Ito | 378/156 |
| 2010/0110655 | A1* | 5/2010 | Tokuyama | 361/816 |
| 2011/0006112 | A1* | 1/2011 | Mueller | 235/379 |

* cited by examiner

*Primary Examiner* — Allyson Trail
(74) *Attorney, Agent, or Firm* — Harden E. Stevens, III

(57) ABSTRACT

An electromagnetic signal transmitter for fraud prevention in a self-service terminal is described. The electromagnetic signal transmitter comprises a plurality of coil drives. The plurality of coil drives may include a first inductive coil drive comprising a first pair of opposing poles; and a second inductive coil drive comprising a second pair of opposing poles, where the second pair of opposing poles are offset from the first pair of opposing poles in at least two dimensions.

14 Claims, 8 Drawing Sheets

FRAUD PREVENTION

FIELD OF INVENTION

The present invention relates to fraud prevention. In particular, although not exclusively, the invention relates to preventing unauthorized reading of data from a card.

BACKGROUND OF INVENTION

Unauthorized reading of card data, such as data encoded on a magnetic stripe card, while the card is being used (hereafter "card skimming"), is a known type of fraud. Card skimming is typically perpetrated by adding a magnetic read head (hereafter "alien reader") to a fascia of an automated teller machine (ATM) to read a magnetic stripe on a customer's card as the customer inserts or (more commonly) retrieves the card from an ATM. The customer's personal identification number (PIN) is also ascertained when the customer uses the ATM. Examples of how this is achieved include: a video camera that captures images of the PINpad on the ATM, a false PINpad overlay that captures the customer's PIN, or a third party watching the customer ("shoulder surfing") as he/she enters his/her PIN. The third party can then create a card using the card data read by the alien reader, and can withdraw funds from the customer's account using the created card and the customer's PIN (ascertained by one of the ways described above).

Various methods have been proposed to defeat this type of fraud. One method involves transmitting an electromagnetic signal (hereafter a "jamming signal") when the card is being transported so that the alien reader cannot detect the magnetically encoded data because of the presence of the jamming signal. Although this technique can be effective, it is possible to use signal processing to cancel out a jamming signal by using another alien reader that receives only the jamming signal and uses this as a reference signal. The reference signal is used to cancel out the jamming signal by subtracting the reference signal from the composite signal (comprising the reference signal and the magnetic signal representing account data from the data card) to reveal the account data signal.

It would be advantageous to be able to prevent or mitigate filtering out of the jamming signal.

SUMMARY OF INVENTION

Accordingly, the invention generally provides methods, systems, apparatus, and software for providing improved fraud prevention using a plurality of coil drives.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed.

Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided an electromagnetic signal transmitter for fraud prevention in a self-service terminal, the electromagnetic signal transmitter comprising:

a first inductive coil drive comprising a first pair of opposing poles; and a second inductive coil drive comprising a second pair of opposing poles, where the second pair of opposing poles are offset from the first pair of opposing poles in at least two dimensions.

The first and second inductive coil drives may be mounted on a circuit board.

The first and second pair of opposing poles may be oriented so that when the circuit board is mounted in a card reader guide, the first and second pairs of opposing poles are oriented transverse to a path along which a magnetic stripe on a data card travels.

Each inductive coil drive may comprise a generally C-shaped ferrite core wound with wire at a central portion.

The electromagnetic signal transmitter may further comprise an external controller for creating a first drive signal for the first inductive coil drive and a second drive signal for the second inductive coil drive.

The external controller may include an inductive coil drive circuit operable to create a signal for each inductive coil drive having a fixed frequency. The fixed frequency may be a frequency selected from the range of approximately one hundred Hertz to ten kilohertz (100 Hz to 10 kHz), or the narrower range of 500 Hz to 3 kHz. In one embodiment, the fixed frequency may be 2 kHz.

Alternatively, the external controller may include an inductive coil drive circuit operable to create a signal for each inductive coil drive having a frequency that hops periodically within a defined range (such as 500 Hz to 2.5 kHz). The frequency may hop after every cycle (for example, triggered by a zero crossing detector) or after every "p" cycles, where "p" is a number between two and one hundred.

The external controller may also include a random signal generator circuit to create a first random signal for superimposing on the fixed frequency to excite the first inductive coil drive, and to create a second (different) random signal for superimposing on the fixed frequency to excite the second inductive coil drive.

The random signal generator may create a random digital signal (that is, a bit pattern sequence) or a random analogue signal (that is, a signal of continuously varying frequency).

Where a random analogue signal is created, the continuously varying frequency may range between upper and lower frequency limits. The lower frequency limit may be approximately 500 Hz; the upper frequency limit may be approximately 10 kHz; although any other convenient frequency limits may be chosen.

Random signal generators are well known to those of skill in the art. For example, resistors and Zener diodes may be used. If a Zener diode is biased at the knee of the avalanche breakdown region of its current-voltage characteristic curve then it will exhibit random noise voltage. This noise voltage can be used to generate a random signal.

Random signals generated from such electrical components are typically of low voltage and low current, so they are usually amplified to produce a stronger random analogue signal. If a digital signal is required, then this random analogue signal can be sampled at different points in time to generate digital data. The digital data may itself represent a random number, or several samples of digital data may be combined to form a random number with several bits.

The first pair of opposing poles may be offset from the second pair of opposing poles in the same plane.

It should now be appreciated that the offsetting of the pairs of opposing poles in at least two dimensions makes it more difficult for a fraudster to filter out the combined signal from the two inductive coil drives.

According to a second aspect there is provided a method of energizing an electromagnetic signal transmitter for fraud prevention in a self-service terminal, the method comprising:

creating a first drive signal comprising a fixed base frequency onto which is superimposed a random signal;

creating a second drive signal comprising a fixed base frequency onto which is superimposed a different random signal;

energizing a first inductive coil drive using the created first drive signal; and energizing a second inductive coil drive, longitudinally offset from the first inductive coil drive, using the created second drive signal.

According to a third aspect there is provided a self-service terminal (SST) comprising:

a card reader operable to detect presentation of a card;

a card reader guide mounted onto a fascia of the self-service terminal and aligned with the card reader; and an electromagnetic signal transmitter located within the card reader guide and comprising:

a first inductive coil drive including a first pair of opposing poles; and a second inductive coil drive including a second pair of opposing poles, where the second pair of opposing poles are offset from the first pair of opposing poles in at least two dimensions.

The self-service terminal may further comprise a proximity sensor operable to detect a customer's card while the card is presented by the customer.

The proximity sensor may also be located within a card reader guide.

The self-service terminal may be an automated teller machine (ATM), an information kiosk, a financial services centre, a bill payment kiosk, a lottery kiosk, a postal services machine, a check-in and/or check-out terminal such as those used in the retail, hotel, car rental, gaming, healthcare, and airline industries, and the like.

According to a fourth aspect there is provided an electromagnetic signal transmitter for fraud prevention in a self-service terminal, the electromagnetic signal transmitter comprising a plurality of coil drives.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

Figure 1:
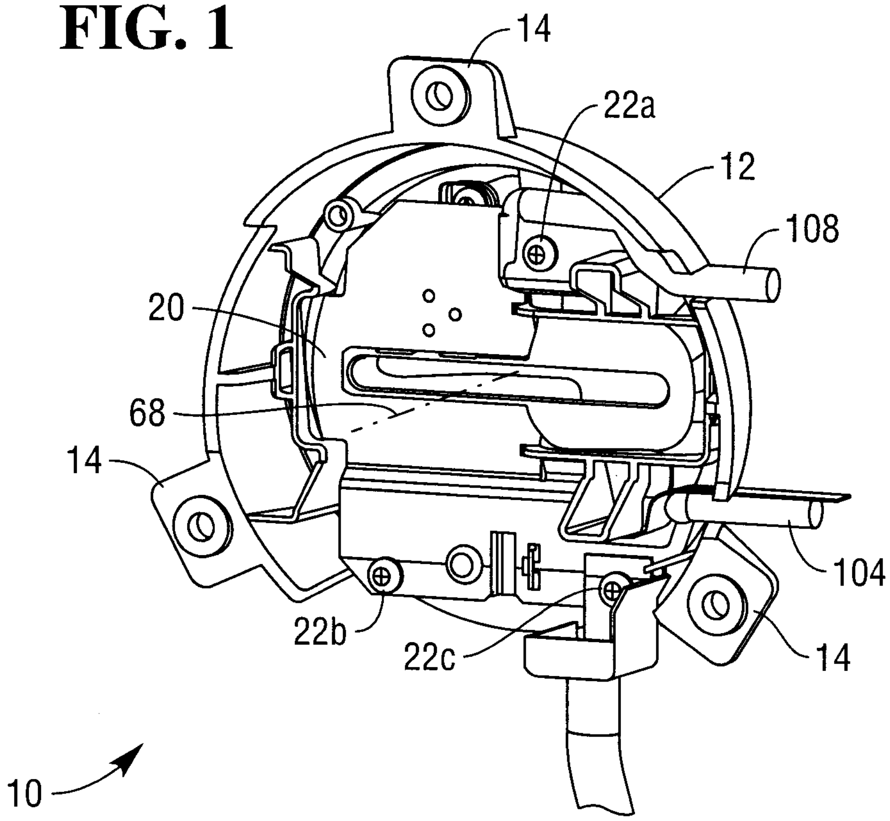
FIG. 1 is a pictorial diagram of a rear perspective view of a card reader guide for use in a self-service terminal (SST) according to one embodiment of the present invention.

It should be appreciated that some of the drawings provided are based on computer renderings from which actual physical embodiments can be produced. As such, some of these drawings contain details that are not essential for an understanding of these embodiments but will convey useful information to one of skill in the art. Therefore, not all parts shown in the drawings will be referenced specifically. Furthermore, to aid clarity and to avoid numerous leader lines from cluttering the drawings, not all reference numerals will be shown in all of the drawings. In addition, some of the features are removed from some views to further aid clarity.

DETAILED DESCRIPTION

Reference is first made to FIG. 1, which is a pictorial diagram of a rear perspective view of a card reader guide 10 according to one embodiment of the present invention. The card reader guide 10 comprises a card reader guide cover 12 defining three apertured tabs 14 by which the card reader guide cover 12 is coupled to a rear part of a fascia (not shown in FIG. 1) of an SST.

The card reader guide 10 further comprises a shielding plate 20 coupled to the card reader guide cover 12 by three screws 22*a,b,c*.

Figure 2:
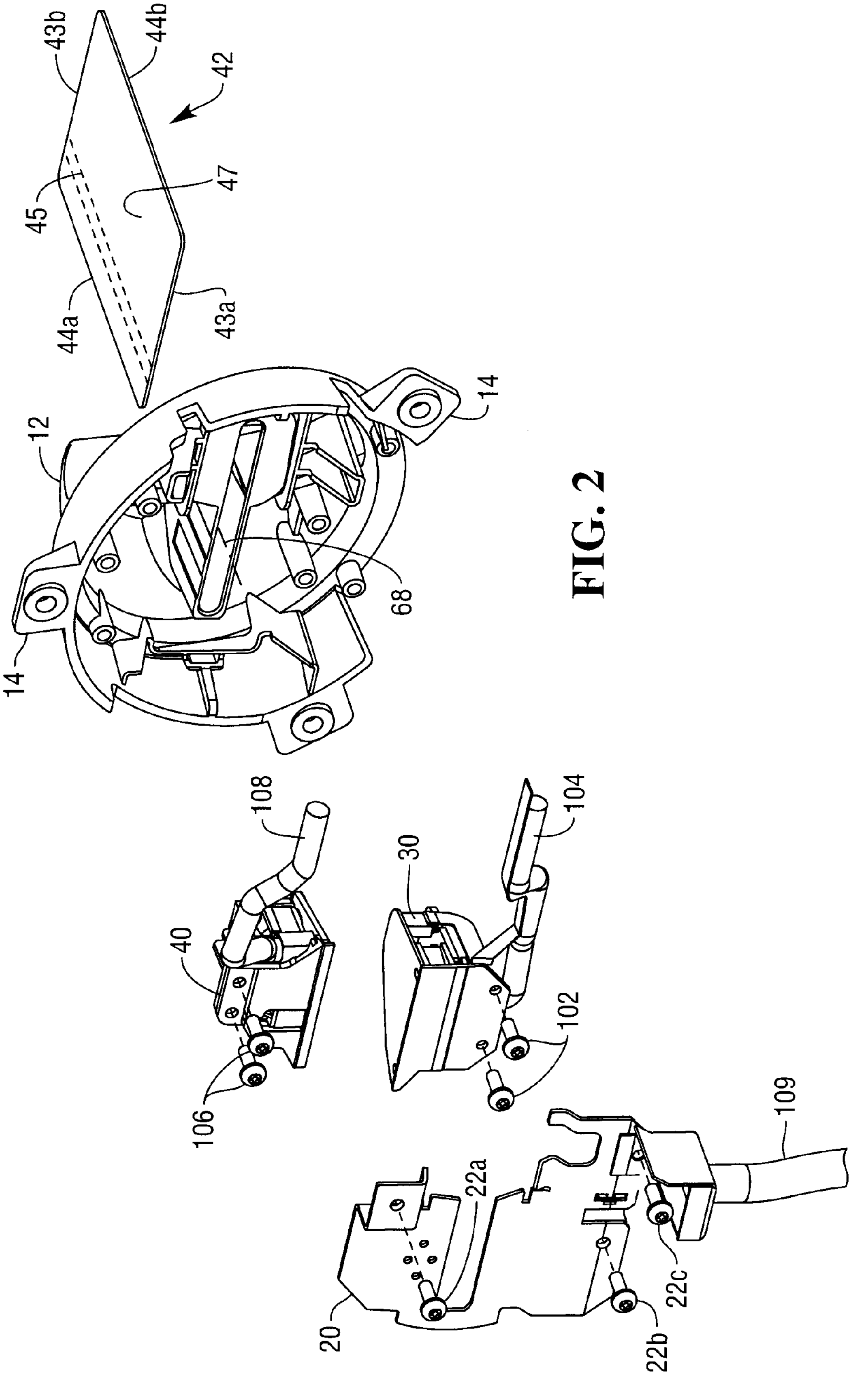
FIG. 2 is an exploded pictorial diagram illustrating components of the card reader guide of FIG. 1.

Reference is now also made to FIG. 2, which is an exploded pictorial diagram illustrating components of the card reader guide 10. FIG. 2 illustrates a proximity detector 30 in the form of a magnetic reader detector and a signal generator 40 for creating a jamming signal. FIG. 2 also shows a data card 42 (in the form of a magnetic stripe card) aligned with the card reader guide 10.

The card reader guide 10 is operable to receive the magnetic stripe card 42, which is inserted by a customer. A magnetic stripe card has a large planar area (the length and width) on each of two opposing sides and a four thin edges therebetween. Two of these edges (front and rear) 43*a,b* are narrower than the other two edges (the side edges) 44*a,b*. The magnetic stripe side (the lower side) of a card refers to the large planar area that carries a magnetic stripe 45 (shown in broken line in FIG. 2). The magnetic stripe 45 is disposed parallel to the side edges 44*a,b*.

Opposite the magnetic stripe side (the upper side 47) there is a large planar area that (typically) does not carry a magnetic stripe 45, but typically includes account and customer information embossed thereon. On some cards, the upper side 47 may carry integrated circuit contacts. On the magnetic stripe side of the card, the magnetic stripe 45 is not centrally located; rather, it is located nearer to one of the side edges (referred to as the magnetic stripe edge 44*a*) than to the other side edge (referred to as the non-magnetic stripe edge 44*b*).

Figure 3:
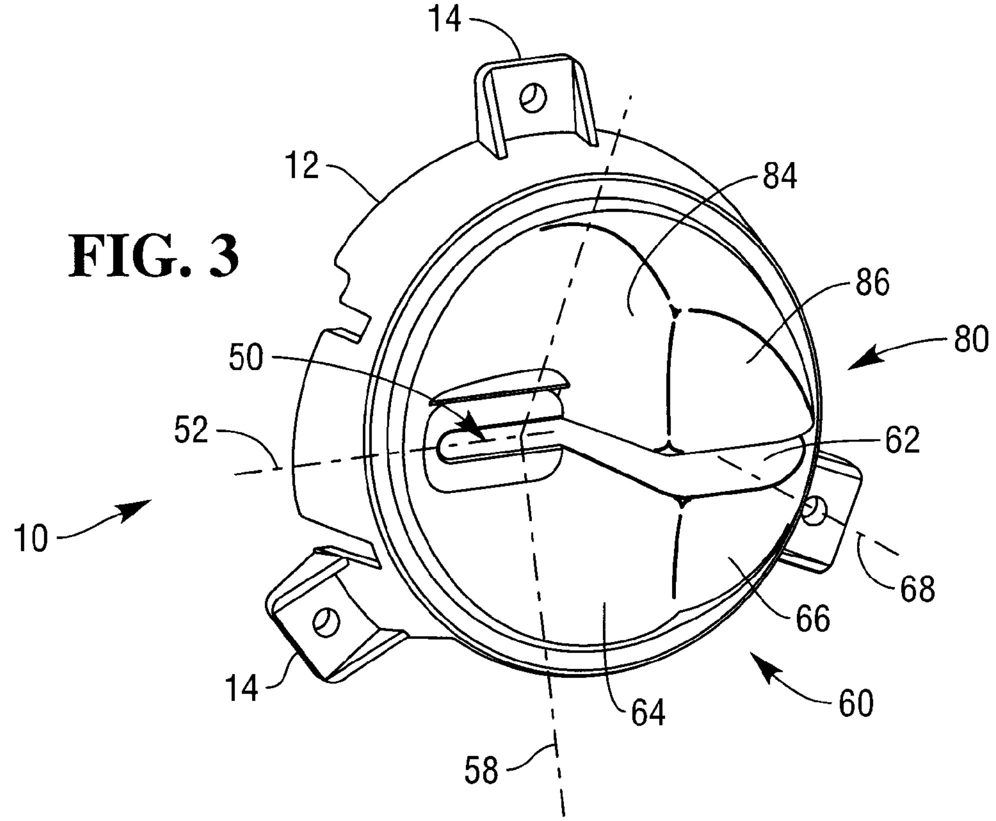
FIG. 3 is a front perspective view of one part (the card reader guide cover) of the card reader guide of FIG. 1.
Figure 4:
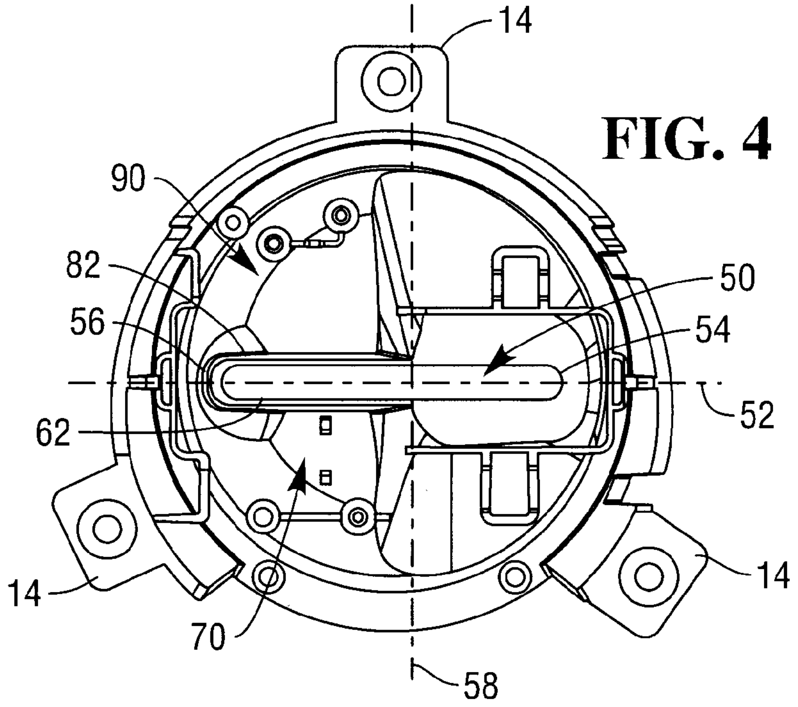
FIG. 4 is a rear perspective view of the card reader guide cover of FIG. 3.

Reference will now also be made to FIGS. 3 and 4, which are front and rear perspective views, respectively, of the card reader guide cover 12.

The card reader guide cover 12 comprises a moulded plastics part dimensioned to be accommodated within, and partially protrude through, an aperture in a fascia (not shown).

The card reader guide 10 defines a card slot 50 extending generally horizontally across the guide 10 in the direction of centre line 52, from a non-stripe end 54 to a stripe end 56. When the magnetic stripe card 42 is correctly inserted into the card slot 50 by a customer then the magnetic stripe 45 on the magnetic stripe card 42 is located closer to the stripe end 56 than to the non-stripe end 54.

The card reader guide 10 defines a breakout line 58 extending generally vertically (perpendicular to the card reader slot 50). The card reader guide 10 also defines a first (lower) protrusion 60.

The first (lower) protrusion 60 includes a planar section 62 across which the magnetic stripe side of a card passes as the card 42 is inserted. The first (lower) protrusion 60 also includes an upright section 64 that extends from the breakout line 58 to an end surface 66. The end surface 66 is spaced from the card slot 50 to ensure that card does not protrude beyond the end surface 66 when ejected by a card reader (not shown) within the SST.

A magnetic stripe path 68 is defined on the planar section 62. This is the portion of the planar section 62 that the magnetic stripe 45 on a correctly inserted data card 42 will be in registration with when the card 42 is inserted or removed by a customer. In this embodiment, the magnetic stripe path 68 is centered on track two of a magnetic stripe. It is track two that carries the customer account information for the data card 42, so track two is the track that alien readers attempt to read.

The first protrusion 60 also defines a cavity (best seen in FIG. 4 and shown generally by arrow 70), which is referred to herein as the "detector cavity", and which is beneath the planar section 62 and within the card reader guide cover 12.

The card reader guide 10 defines a second (upper) protrusion 80 similar to, aligned with, and opposite the first protrusion 60.

The second (upper) protrusion 80 includes a planar section 82 (best seen in FIG. 4) beneath which a magnetic stripe side of a card 42 passes as the card 42 is inserted. The second (upper) protrusion 80 also includes an upright section 84 that extends from the breakout line 58 to an end surface 86. The second protrusion 80 defines a cavity 90 (referred to herein as the "signal generator cavity") above the planar section 82 and within the card reader guide cover 12.

Referring again to FIG. 2, the magnetic reader detector 30 is dimensioned to be accommodated within the detector cavity 70 and is mounted therein by two screws 102 that engage with the card reader guide 10. The magnetic reader detector 30 includes a communication cable 104 for routing signals and power between the magnetic reader detector 30 and an external controller (not shown in FIG. 2). Such a controller would typically be located in an SST in which the card reader guide 10 is installed.

Similarly, the signal generator 40 is dimensioned to be accommodated within the signal generator cavity 90 and is mounted therein by two screws 106 that engage with the card reader guide 10. The signal generator 40 also includes an output cable 108 for routing signals and power between the signal generator 40 and the external controller (not shown in FIG. 2).

A drainage pipe 109 is also provided to drain away any water ingress from the card slot 50.

Figure 5:
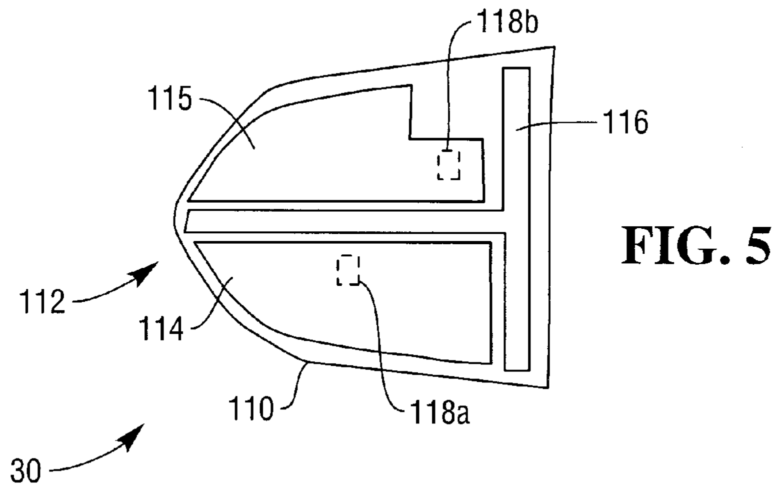
FIG. 5 is a pictorial plan view of part (the magnetic reader detector) of one of the components of the card reader guide shown in FIG. 2.

Reference will now be made to FIG. 5, which is a pictorial plan view of part of the magnetic reader detector 30. The magnetic reader detector 30 comprises a track printed circuit board (pcb) 110 on which is disposed part of a capacitive sensor 112 and an electronic drive circuit (not shown) located beneath the track pcb 110.

The magnetic reader detector 30 is physically configured to conform to the shape of the detector cavity 70 so that when the magnetic reader detector 30 is inserted into the detector cavity 70 the track pcb 110 fits securely in place.

The capacitive sensor 112 operates in a similar way to a capacitive proximity sensor, as will now be described. The capacitive sensor 112 comprises a transmit plate 114 separated from a receive plate 115 by a linear track (a ground strip) 116. The transmit plate 114, receive plate 115, and ground strip 116 are all defined as conducting tracks on the track pcb 110.

The ground strip 116 is located on the track pcb 110 such that when the magnetic reader detector 30 is inserted into the lower protrusion 60 of the card reader guide 10, the ground strip 116 is in registration with the magnetic stripe path 68. In particular, the ground strip 116 is aligned with track two of the magnetic stripe path 68. This is illustrated in FIG. 6, which is a pictorial perspective view of the card reader guide 10, with the card reader guide cover 12 shown as partially transparent to reveal the magnetic reader detector 30.

The capacitive sensor 112 operates by transmitting an alternating signal on the transmit plate 114, which creates an electric field between the transmit plate 114 and the receive plate 115 that arches over the ground strip 116, the air gap in the arch providing the dielectric. If a material (such as an alien reader, or a data card) is inserted into this electric field then the dielectric changes, which changes the phase and magnitude of the electric field. This is detected by the receive plate 115.

Figure 6:
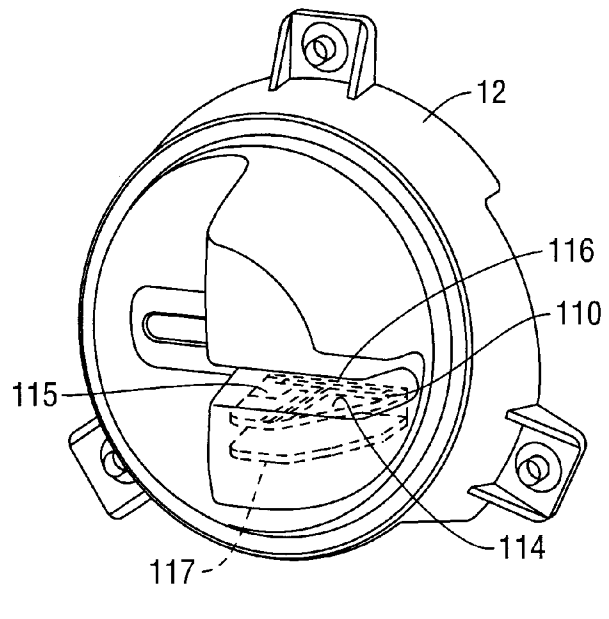
FIG. 6 is a pictorial perspective view of the card reader guide of FIG. 1, with the card reader guide cover of FIG. 3 shown as partially transparent to reveal the magnetic reader detector of FIG. 5 located therein.

Drive and signal processing circuitry (not shown) is located on a drive pcb 117 (located beneath the track pcb 110, as shown in FIG. 6) to provide the alternating signal and detect the phase and magnitude changes.

The geometry, configuration, and location of the transmit plate 114, receive plate 115, and ground strip 116 optimizes the probability of the capacitive sensor 112 detecting an alien reader, because any alien reader must be located at a point over which track two of the card's magnetic stripe will pass, and the electric field is located along this path.

The track pcb 110 also includes two magnetic sensors 118*a,b* mounted on an underside thereof.

The communication cable 104 conveys one signal from each of the two magnetic sensors 118, power to supply the capacitive sensor 112, and one response signal from the capacitive sensor 112.

Figure 7:
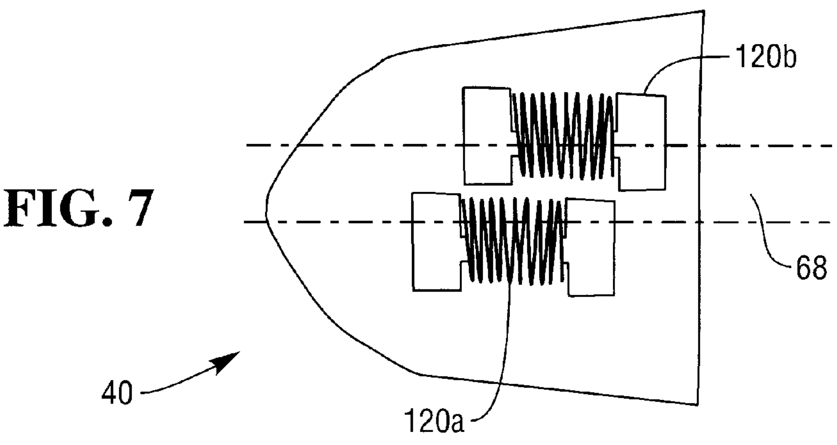
FIG. 7 is a pictorial plan view of another part (the signal generator) of one of the components of the card reader guide shown in FIG. 2.
Figure 8:
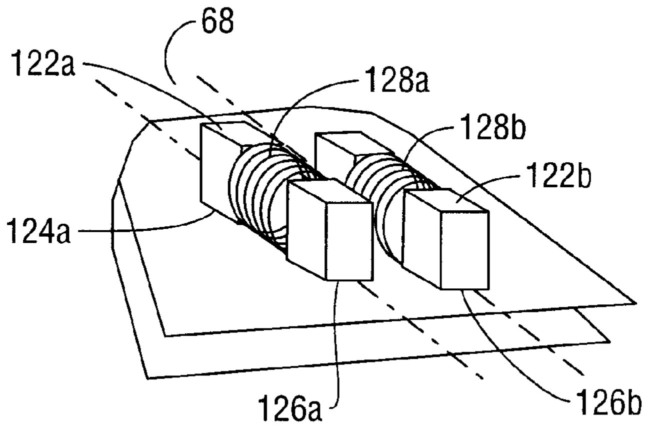
FIG. 8 is a pictorial perspective view of the signal generator of FIG. 7.

Reference will now be made to FIGS. 7 and 8, which are a pictorial plan view and perspective view respectively, of part of the signal generator 40 shown relative to the magnetic stripe path 68.

The signal generator 40 comprises a pair of inductive coil drives 120*a,b*. Each inductive drive coil 120*a,b* comprises a generally C-shaped (when viewed from the side) ferrite core 122*a,b* having opposing poles (north pole 124*a,b* (only 124*a* is shown) and south pole 126*a,b*) at opposite ends, and being wound with wire 128*a,b* at a central portion. Each inductive coil drive 120*a,b* is driven by a signal from the external controller (not shown). The C-shape of the ferrite cores ensures that most of the electromagnetic field generated by the inductive coil drives 120*a,b* extends downwards towards the magnetic stripe path 68, rather than upwards.

Each of the inductive coil drives 120*a,b* straddles the magnetic stripe path 68 but the two inductive coil drives are longitudinally offset relative to each other (as shown in FIG. 7). Thus, at least one of the two inductive coils 120*a,b* is not centered on the magnetic stripe path 68. This longitudinal offsetting makes it more difficult for a fraudster to filter out the combined signal from the two inductive coil drives 120*a, b*.

One of the two magnetic sensors 118*a,b* is in registration with a centre point between the poles 124*a*, 126*a* of the first ferrite core 122*a*, the other of the two magnetic sensors 118*b* is in registration with a centre point between the poles of the second ferrite core 122*b*. Each of the two magnetic sensors 118*a,b* measures the magnetic signal present. If the two inductive coils 120*a,b* are active then a large magnetic signal should be detected by each of the two magnetic sensors 118*a, b*.

Figure 9:
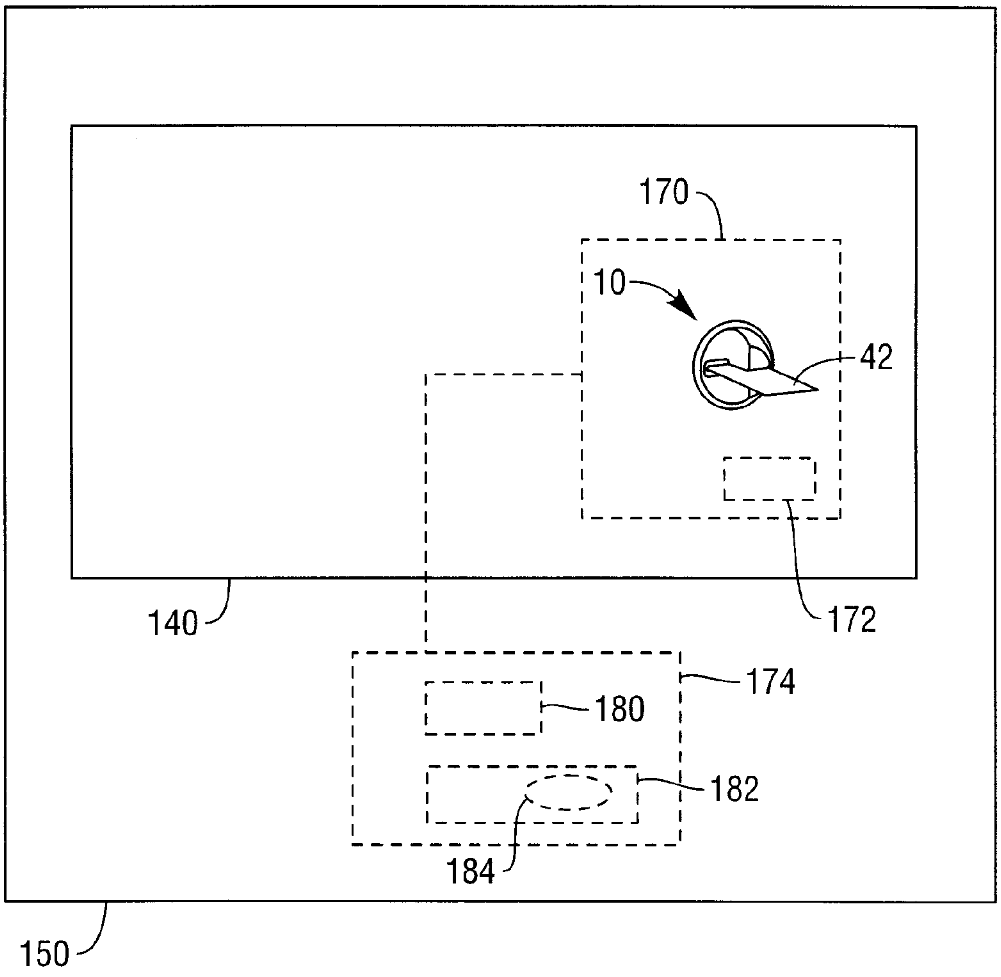
FIG. 9 is a simplified schematic view of a fascia of the SST incorporating the card reader guide of FIG. 1 and illustrating an SST controller operable to control the SST.

Reference will now also be made to FIG. 9, which is a pictorial diagram of a fascia 140 of an SST 150 that includes the card reader guide 10, and shows the data card 42 partially inserted therein.

A motorized card reader 170 (illustrated in broken line) is aligned with, and located behind, the card reader guide 10 so that a card transport path (not shown) in the card reader 170 aligns with the card slot 50 of the card reader guide 10. The card reader 170 includes a card reader controller 172 for controlling operation of the card reader 170.

In this embodiment the motorized card reader is from Sankyo Seiki Mfg Ltd at 1-17-2, Shinbashi, Minato-Ku, Tokyo, 1058633, Japan. However, any other suitable motorized card reader could be used.

The SST also includes an SST controller 174, which includes a card guide control circuit 180 implemented as an expansion board that slots into a motherboard (not shown) on which a processor 182 is mounted. The processor 182 executes an SST control program 184.

The SST control program 184 controls the operation of the SST, including communicating with modules such as the card reader 170, and presenting a sequence of screens to a customer to guide the customer through a transaction.

Figure 10:
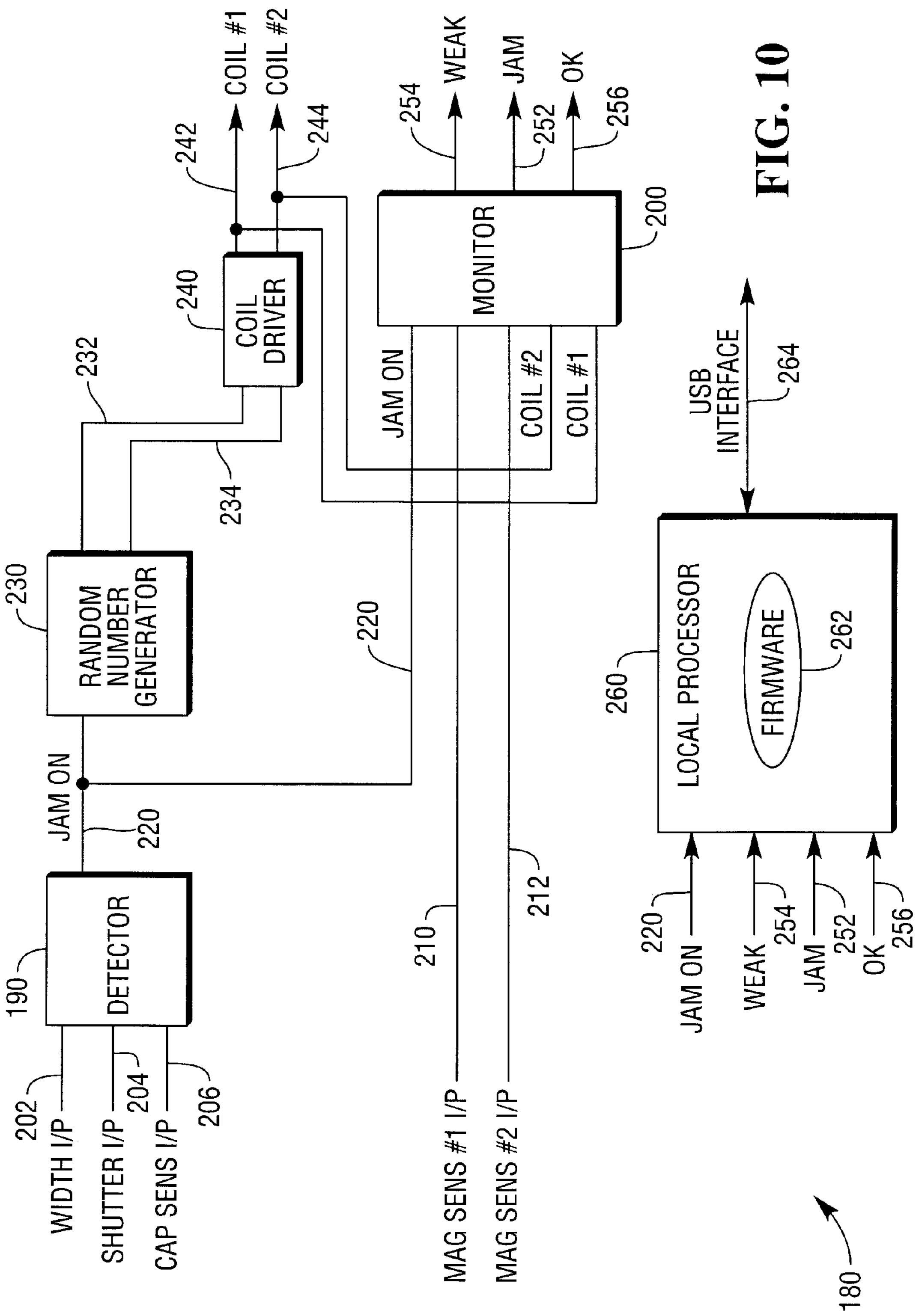
FIG. 10 is a block diagram of a detector controller for controlling the operation of the magnetic reader detector of FIG. 5 and the signal generator of FIG. 7.

Reference will now also be made to FIG. 10, which is a simplified block diagram of the card guide control circuit 180 that is used to control the electronic components in the card reader guide 10 and to indicate if an alien reader may be present.

The control circuit 180 receives five inputs. Three of these inputs are fed into a detector 190, the other two inputs are fed into a monitor 200.

One of the detector inputs (the width switch status) 202 comes from the card reader 170 and indicates the status of a width switch (not shown) on the card reader 170. As is known in the art, when the width switch is closed, this indicates that an object inserted into the card reader 170 has a width that matches that of a standard data card.

Another of the detector inputs (the shutter status) 204 indicates the status of a shutter (not shown) in the card reader 170. The shutter can either be open or closed and controls access to a card reader path within the card reader 170. The shutter 170 is only opened by the card reader controller 172 (FIG. 9) within the card reader 170 if the width switch is closed and a magnetic pre-read head (not shown) in the card reader 170 detects a magnetic stripe. As is known in the art, the pre-read head is used to ensure that a data card has been inserted in the correct orientation.

The third detector input (from the capacitive sensor 112) 206 indicates the state of the output signal from the capacitive sensor 112. The capacitive sensor input 206 indicates whether an object is present in the vicinity of the magnetic stripe path 68.

The two inputs 210,212 (referred to as magnetic signal inputs) that are fed into the monitor 200 are from the two magnetic sensors 118*a,b*. These magnetic signal inputs 210, 212 indicate the presence of a magnetic signal at each of the two magnetic sensors 118*a,b* respectively.

The detector 190 includes logic circuitry (not shown in detail) and provides an active output 220 (referred to as the jam signal) when the width switch is open (the width switch status input 202 is active), the shutter is open (the shutter status input 204 is active), and an alien object is detected by the capacitive sensor input 206 (essentially this is a Boolean AND function). When this condition occurs, the control circuit 180 generates a jamming signal. This should occur every time a card is inserted by a customer because the inserted card changes the dielectric value of the air gap above the capacitive sensor 112.

The jam signal 220 is fed into a random number generator circuit 230 (which may generate truly random or pseudo random numbers). Random number generating circuits are well-known to those of skill in the art so will not be described herein in detail.

The random number generator circuit 230 provides two outputs: a first random signal 232 and a second random signal 234. These two outputs 232,234 (which convey different random signals) are fed into a coil driver circuit 240.

The coil driver circuit 240 generates two base signals (a first base signal and a second base signal), each centered on approximately 2 kHz. The coil driver circuit 240 applies the first random signal 232 to the first base signal; and the second random signal 234 to the second base signal, and outputs these as a first drive signal 242 and a second drive signal 244 respectively. In this embodiment, the random signals are in the form of a bit pattern sequence. The coil driver circuit 240 uses the random signals (the bit pattern sequences) to change the duty cycle of each of the first and second base signals. That is, the random signals are used to provide pulse width modulation of the 2 kHz signals. The important point is that the random signals 232,234 are used to impart some randomness to the regular (2 kHz) base signals. This randomness may comprise pulse width modulation, amplitude modulation, superimposing a high frequency component on a base signal, or any other convenient technique. This added randomness makes it much more difficult to filter out the signals.

The first drive signal 242 is output to the first inductive coil drive 120*a*; and the second drive signal 244 is output to the second inductive coil drive 120*b*. Thus, the first and second drive signals 242,244 are the signals that drive the inductive coil drives 120*a,b*.

The first and second drive signals 242,244 are also output to the monitor 200. The main purpose of the monitor 200 is to ensure that the magnetic reader detector 30 is not being (i) jammed by an external signal, or (ii) screened so that it does not detect an alien reader. To achieve this purpose, the monitor 200 continually monitors the two magnetic signal inputs 210,212 from the two magnetic sensors 118*a,b*. As mentioned above, these magnetic signal inputs 210,212 indicate the presence of electromagnetic signals at the two magnetic sensors 118*a,b*.

The monitor 200 correlates these two magnetic signal inputs 210,212 with the jam signal 220. Due to time delays in creating an electro-magnetic field at the coil drives 120, there will be a short delay between each of the coil drive signals 242,244 going active, and the two magnetic sensors 118*a,b* detecting an electro-magnetic field. Hence there will be a delay between the coil drive signals 242,244 going active and the magnetic signal inputs 210,212 going active. Similarly, when the coil drive signals 242,244 go inactive, there will be a short delay before the magnetic signal inputs 210,212 go inactive.

If the monitor 200 detects that a magnetic signal input 210,212 is active at the instant when the associated coil drive signal 242,244 has just transitioned to active, then this may indicate that a third party is attempting to jam the magnetic reader detector 30. This is because there should be a time delay between the coil drive signal 242,244 going active and an electro-magnetic field being detected. If there is no time delay, then the magnetic signal input 210,212 that was detected as active must have been active before the coil drive signal was activated. If such an event occurs on "m" consecutive occasions, then the monitor 200 activates a jam attack output 252. The jam attack output 252 indicates that an electromagnetic field is present that was not generated by the coil drives 120*a,b*. In this embodiment, "m" is four, so the jam attack output 252 is activated if this condition occurs on four consecutive occasions.

Similarly, if the monitor 200 detects that a magnetic signal input 210,212 is inactive at the instant when the associated coil drive signal 242,244 has just transitioned to inactive, then this may indicate that a third party is attempting to shield (or screen) the magnetic reader detector 30 from the electromagnetic field generated by the coil drives 120*a,b*. This is because there should be a time delay (a time lag) between the coil drive signal 242,244 going inactive and the electro-magnetic field generated by those coil drives 120*a,b* reducing to zero. If there is no time delay, then the magnetic signal input 210,212 that was detected as inactive must have been inactive before the coil drive signal was inactivated. If such an event occurs on "n" consecutive occasions, then the monitor 200 activates a weak output 254. The weak attack output 254 indicates that no electromagnetic field is present even though the coil drives 120*a,b* are generating (or attempting to generate) an electromagnetic field. This may indicate that a third party is attempting to shield (or screen) the two inductive coil drives 120*a,b* to prevent them from jamming an alien reader. In this embodiment, "n" is four, so the weak output 254 is activated if this condition occurs on four consecutive occasions.

If both of the magnetic sensors 118*a,b* detect electromagnetic signals that correlate with the first and second drive signals 242,244, then the monitor 200 activates a normal (OK) output 256 to indicate that the correct jamming signals have been detected from the inductive coil drives 120*a,b*. In other words, if both of the magnetic sensors 118*a,b* detect electromagnetic signals that are correctly offset from the first and second drive signals 242,244 respectively, then the monitor 200 activates the normal output 256. In this embodiment, correctly offset means that there is a time delay between each of the magnetic sensors 118*a,b* and its associated first and second drive signal 242,244 that corresponds to an expected time delay.

The card guide circuit 180 also includes a local processor 260 executing firmware 262. The firmware 262 interfaces with the logic circuitry in the card guide circuit 180, and communicates with the SST control program 184 via a USB interface 264.

The local processor 260 receives the three outputs 252,254, 256 from the monitor 200 and also the jam signal 220, and the firmware 262 decides whether to raise an alarm based on the status of these signals.

The firmware 262 may transmit an alarm signal if the jam signal 220 is active for longer than a predetermined length of time, for example, one minute, or if either of the weak output 254 or the jam attack output 252 is active, or if either of the weak output 254 or the jam attack output 252 is active for longer than a predetermined time (for example, five seconds).

The firmware 262 communicates with the SST control program 184 and provides an alarm signal (which may be active or inactive) thereto over the USB interface 264. This enables the SST control program 184 to take action if the alarm signal is active. The firmware 262 may also include a simple network management protocol (SNMP) agent (not shown) that transmits a trap to a remote management centre (not shown) if the alarm signal is set active by the firmware 262.

During operation, when a customer inserts the data card 42, the width switch is closed and the pre-read head detects the magnetic stripe 45 on the underside of the card 42. The card reader 170 then opens the shutter. The capacitive sensor input 206 indicates that an object (the data card 42) is present. This combination causes the detector 190 to activate the jam signal 220.

The active jam signal 220 causes the random number generator 230 to generate the first and second random signals 232,234, which the coil driver 240 applies to the first and second base signals to generate the first and second drive signals 242,244, which now have different duty cycles. These signals 242,244 are used to power the inductive coil drives 120*a,b* respectively, which create electromagnetic fields around the data card 42. In this embodiment, the random signals 232,234 are continuous bit streams that are applied to the base signals as the base signals are being generated.

The monitor 200 attempts to correlate the two inputs 210, 212 from the two magnetic sensors 118*a,b* with the first and second drive signals 242,244.

If the signals correlate (that is, the transitions are correct and occur at approximately the correct time delay) then the monitor 200 activates the normal (OK) output 256.

If when the first drive signal 242 goes active, the magnetic signal input 210 is already active, then the monitor 200 records this as a potential jam and increments a counter. If this occurs four times in succession, then the monitor 200 activates the jam attack output 252. If this does not happen four times in succession, for example, on the third occasion the status is correct, then the monitor 200 resets the counter.

Similarly, if when the second drive signal 244 goes inactive, the magnetic signal input 212 is already inactive, then the monitor 200 records this as a potential shielding attack and increments a counter. If this occurs four times in succession, then the monitor 200 activates the weak output 254. If this does not happen four times in succession, for example, on the second occasion the status is correct, then the monitor 200 resets the counter.

In this embodiment, if the jam attack signal 252 or the weak output 254 is active, then the card guide control circuit 180 (specifically, the firmware 262) transmits an alarm to the SST control program 184. This causes the SST control program 184 to return the data card 42 to the customer then put the SST 150 out of service and send an alarm signal to a remote management centre (not shown) to request a visit from a service engineer.

Another feature of this embodiment is that it can ascertain if the card reader guide 10 has been interfered with, for example, by removing the card reader guide 10 from the fascia 140 and replacing the card reader guide 10 with a false reader guide incorporating an alien reader. Once removed from the fascia 140, the card reader guide 10 may be placed by a fraudster within the SST 150 so that it still sends signals to the card guide control circuit 180 but is not able to jam the alien reader because it is too far away from the alien reader. This embodiment detects this type of activity by correlating a signal from the card reader guide 10 with a signal from the card reader 170, as will now be described with reference to FIGS. 11 and 12.

Figure 11:
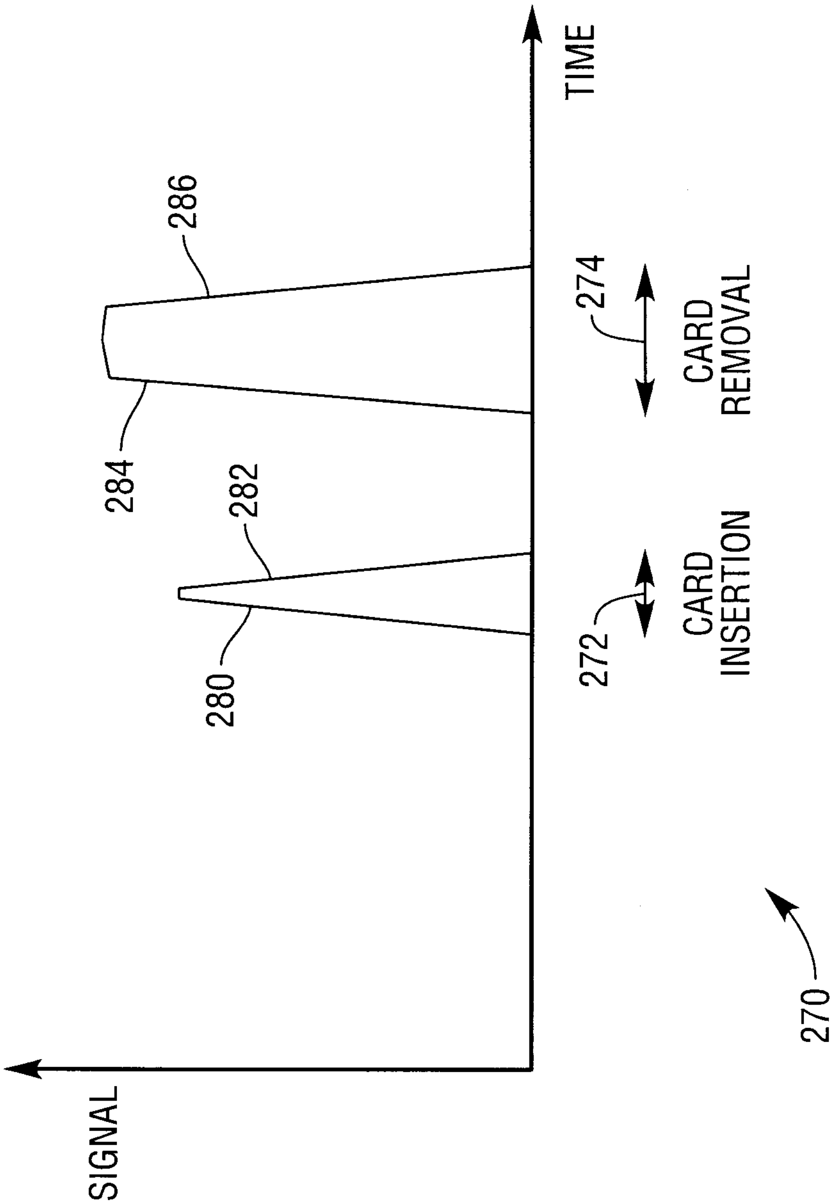
FIG. 11 is a graph illustrating a signal from the magnetic reader detector of FIG. 5 while a customer's hand is present in the vicinity of the card reader guide of FIG. 1 to insert and then remove a card.

FIG. 11 is a graph 270 illustrating a signal from the magnetic reader detector 30 while a customer's hand is present in the vicinity of the card reader guide 10.

As is shown in FIG. 11, there are two main areas where a signal is positive, namely, where the customer's hand is present at card insertion (region 272) and where the customer's hand is present at card removal (region 274).

At the card insertion zone 272, when the customer's hand approaches the card reader guide 10 to insert the data card 42, the magnetic reader detector 30 generates a rising signal 280; whereas, when the customer's hand leaves the card reader guide 10 after inserting the data card 42, the magnetic reader detector 30 generates a falling signal 282.

At the card removal zone 274, when the customer's hand approaches the card reader guide 10 to remove the data card 42, the magnetic reader detector 30 generates a rising signal 284; whereas, when the customer's hand leaves the card reader guide 10 after removing the data card 42, the magnetic reader detector 30 generates a falling signal 286.

Figure 12:
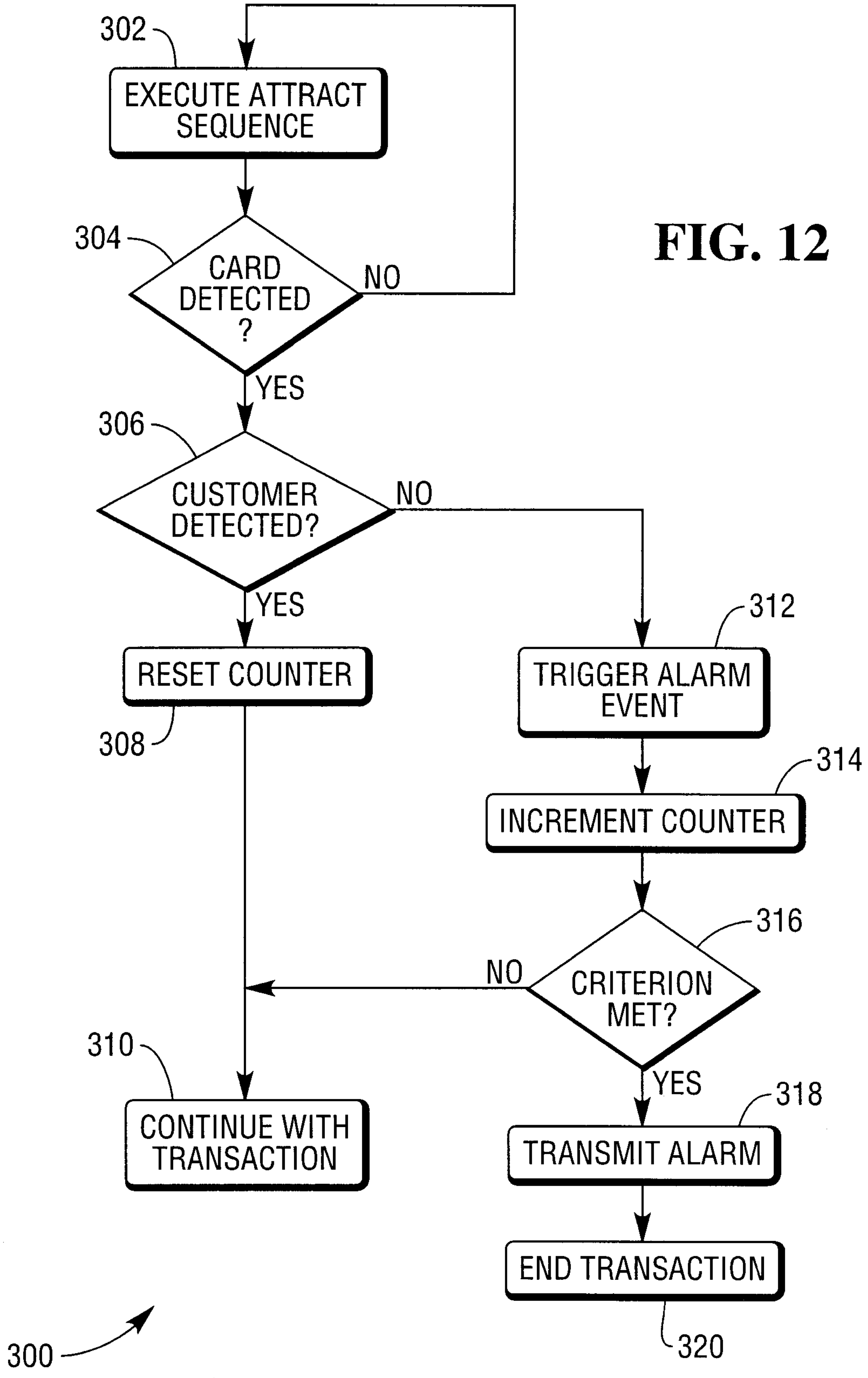
FIG. 12 is a flowchart illustrating the operation of software components executing on the SST controller of FIG. 9.

FIG. 12 is a flowchart 300 illustrating the operation of the SST control program 184 with respect to customer presence detection while a customer is inserting the data card 42. These steps are performed concurrently with, and independently of, some of the steps performed by the card guide control circuit 180 of FIG. 10.

Initially, the SST control program 184 executes an attract sequence (step 302) during which a screen is presented inviting a customer to insert his/her data card.

The SST control program 184 awaits notification from software (drivers and/or service providers) associated with the card reader 170 that a data card has been received in the card reader 170 (step 304).

Once a data card has been received, the SST control program 184 ascertains if a customer has been detected by the magnetic reader detector 30 (step 306). In this embodiment, this is implemented by the firmware 262 notifying the SST control program 184 when the jam signal (on output 220 from the detector 190) is active. This is because the jam signal is only active when the width switch is closed, the shutter is open, and the magnetic reader detector 30 detects the customer (and/or the customer's card).

If a customer is detected (typically the customer's hand will still be sufficiently close to the card reader guide 10 to be detected by the magnetic reader detector 30) then the SST control program 184 resets a counter (step 308) and continues with the transaction as normal (step 310).

If a customer is not detected then an alarm event is triggered by the SST control program 184 (step 312).

The SST control program 184 then increments a counter (step 314) and ascertains if a predetermined criterion has been met (step 316). This predetermined criterion may be set so that a single alarm event will satisfy the criterion; alternatively, multiple consecutive alarm events may be required. In this embodiment, two successive alarm events are required (that is, two customers in a row must not be detected) before the SST control program 184 transmits an alarm to the remote management centre.

If the predetermined criterion has not been met, then the transaction proceeds as normal (step 310).

If the next customer is detected by the magnetic reader detector 30 then the SST control program 184 resets the counter (step 308) and proceeds with that transaction (step 310).

If the next customer is not detected by the magnetic reader detector 30, then the predetermined criterion will have been met (two successive customers not detected). In such an event, the SST control program 184 transmits an alarm signal to the remote management centre (step 318).

The SST control program 184 then returns the data card 42 to the customer, terminates the transaction, and puts the SST 150 out of service (step 320) until a service engineer (dispatched by the remote management centre) visits the SST 150 and confirms that the card reader guide 10 is operating correctly and has not been moved.

It should now be appreciated that this embodiment enables the SST 150 to ascertain if the card reader guide 10 has been removed by attempting to correlate a signal from the card reader guide 10 with a signal from the card reader 170.

Various modifications may be made to the above described embodiment within the scope of the invention, for example, in other embodiments, the number of inductive coil drives 120 may be more than two. In other embodiments, the inductive coil drives 120 may be driven at a frequency other than 2 kHz.

In other embodiments, the number of times in succession that a correlation must be incorrect before the appropriate signal is activated may be more or less than four, and may differ for the jam attack output and the weak output.

In other embodiments, the control circuit 180 may include a built-in alarm.

In other embodiments the shape of the protrusions may differ from those described above.

In other embodiments, the magnetic reader detector 30 may be located outside the card reader guide; for example, the magnetic reader detector 30 may be mounted directly onto the SST fascia.

In other embodiments, instead of using a random digital signal (a bit pattern) superimposed on a fixed signal; the random signal generator may create a random analogue signal (that is, a signal of continuously varying frequency).

In other embodiments, instead of, or in addition to, offsetting the coil drives longitudinally, the coil drives may be laterally offset relative to each other.

The steps of the methods described herein may be carried out in any suitable order, or simultaneously where appropriate.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

What is claimed is:

1. An electromagnetic signal transmitter for fraud prevention in a self-service terminal, the electromagnetic signal transmitter comprising a plurality of coil drives and the plurality of coil drives comprising:

a first inductive coil drive comprising a first pair of opposing poles; and a second inductive coil drive comprising a second pair of opposing poles, where the second pair of opposing poles are offset from the first pair of opposing poles in at least two dimensions.

2. An electromagnetic signal transmitter according to claim 1, wherein the first and second inductive coil drives are mounted on a circuit board.

3. An electromagnetic signal transmitter according to claim 1, wherein the first and second pair of opposing poles are oriented so that when the circuit board is mounted in a card reader guide, the first and second pairs of opposing poles are oriented transverse to a path along which a magnetic stripe on a data card travels.

4. An electromagnetic signal transmitter according to claim 1, wherein each inductive coil drive comprises a generally C-shaped ferrite core wound with wire at a central portion.

5. An electromagnetic signal transmitter according to claim 1, further comprising an external controller for creating a first drive signal for the first inductive coil drive and a second drive signal for the second inductive coil drive.

6. An electromagnetic signal transmitter according to claim 5, wherein the external controller includes an inductive coil drive circuit operable to create a signal for each inductive coil drive having a frequency that hops periodically within a defined range.

7. An electromagnetic signal transmitter according to claim 5, wherein the external controller includes an inductive coil drive circuit operable to create a signal having a fixed frequency for each inductive coil drive.

8. An electromagnetic signal transmitter according to claim 7, wherein the external controller also includes a random signal generator circuit to create a first random signal for superimposing on the fixed frequency to excite the first inductive coil drive, and to create a second, different, random signal for superimposing on the fixed frequency to excite the second inductive coil drive.

9. An electromagnetic signal transmitter according to claim 8, wherein the random signal generator creates a random digital signal.

10. An electromagnetic signal transmitter according to claim 8, wherein the random signal generator creates a random analogue signal.

11. An electromagnetic signal transmitter according to claim 8, wherein the first pair of opposing poles is offset from the second pair of opposing poles in the same plane.

12. A method of energizing an electromagnetic signal transmitter for fraud prevention in a self-service terminal, the method comprising:

creating a first drive signal comprising a fixed base frequency onto which is superimposed a random signal;

creating a second drive signal comprising a fixed base frequency onto which is superimposed a different random signal;

energizing a first inductive coil drive using the created first drive signal; and energizing a second inductive coil drive, longitudinally offset from the first inductive coil drive, using the created second drive signal.

13. A self-service terminal (SST) comprising:

a card reader operable to detect presentation of a card;

a card reader guide mounted onto a fascia of the self-service terminal and aligned with the card reader; and an electromagnetic signal transmitter located within the card reader guide and comprising:

a first inductive coil drive including a first pair of opposing poles; and a second inductive coil drive including a second pair of opposing poles, where the second pair of opposing poles are offset from the first pair of opposing poles in at least two dimensions.

14. A self-service terminal according to claim 13, wherein the self-service terminal further comprises a proximity sensor located within the card reader guide operable to detect a customer's card while the card is presented by the customer.

* * * * *